US011686837B2

(12) United States Patent
Cho

(10) Patent No.: US 11,686,837 B2
(45) Date of Patent: Jun. 27, 2023

(54) APPARATUS AND METHOD FOR DETERMINING KINETIC INFORMATION

(71) Applicant: Samsung Electronics Co., Ltd., Suwon-si (KR)

(72) Inventor: Hyunwoong Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 16/854,423

(22) Filed: Apr. 21, 2020

(65) Prior Publication Data

US 2021/0156988 A1 May 27, 2021

(30) Foreign Application Priority Data

Nov. 21, 2019 (KR) .................. 10-2019-0150691

(51) Int. Cl.
*G01S 13/60* (2006.01)
*G06T 7/70* (2017.01)
(Continued)

(52) U.S. Cl.
CPC ............ *G01S 13/60* (2013.01); *G01S 13/931* (2013.01); *G06T 7/277* (2017.01); *G06T 7/70* (2017.01);
(Continued)

(58) Field of Classification Search
CPC ....... G01S 13/60; G01S 13/931; G06T 7/277; G06T 7/70; G06T 2207/10044; G06T 2207/30252
See application file for complete search history.

(56) References Cited

U.S. PATENT DOCUMENTS 9,983,294 B2    5/2018  Oshima et al.
10,077,979 B2 *  9/2018  Sakamoto ............. G01S 13/931
(Continued)

FOREIGN PATENT DOCUMENTS

KR    10-1163074 B1    7/2012
KR    10-1346916 B1    1/2014
(Continued)

OTHER PUBLICATIONS

Kellner, Dominik et al. "Instantaneous Ego-Motion Estimation using Doppler Radar", *16th International IEEE Conference on Intelligent Transportation Systems (ITSC* 2013), 2013 (pp. 869-874).

(Continued)

*Primary Examiner* — Peter M Bythrow
(74) *Attorney, Agent, or Firm* — NSIP Law

(57) ABSTRACT

A method of determining kinetic information may include: receiving a plurality of raw information related to a plurality of objects using a radar device provided in a vehicle; obtaining, by analyzing the plurality of raw information, a plurality of candidate kinetic information related to the vehicle; estimating, through spatial filtering, current first kinetic information related to the vehicle from the plurality of candidate kinetic information; and correcting, using a kinetic model, the estimated current first kinetic information based on current first kinetic information, wherein the current first kinetic information is predicted from previous first kinetic information related to the vehicle using a kinetic model.

19 Claims, 6 Drawing Sheets

(51) Int. Cl.
    *G01S 13/931*     (2020.01)
    *G06T 7/277*     (2017.01)

(52) U.S. Cl.
    CPC ............... *G06T 2207/10044* (2013.01); *G06T 2207/30252* (2013.01)

(56) References Cited

U.S. PATENT DOCUMENTS

| | | | |
|---|---|---|---|
| 10,444,021 B2 * | 10/2019 | Hare | ................... G06T 7/70 |
| 2019/0196005 A1 | 6/2019 | Calabrese et al. | |

FOREIGN PATENT DOCUMENTS

| | | |
|---|---|---|
| KR | 10-2015-0106200 A | 9/2015 |
| KR | 10-2016-0120467 A | 10/2016 |
| KR | 10-1917313 B1 | 11/2018 |

OTHER PUBLICATIONS

Kellner, Dominik et al. "Instantaneous Ego-Motion Estimation using Multiple Doppler Radars", *2014 IEEE International Conference on Robotics & Automation (ICRA)*, 2014 (pp. 1592-1597).

Grimm, Christopher et al. "Hypothesis Test for the Detection of Moving Targets in Automotive Radar", *2017 IEEE International Conference on Microwaves, Antennas, Communications and Electronic Systems (COMCAS)*, 2017 (pp. 1-7).

\* cited by examiner

APPARATUS AND METHOD FOR DETERMINING KINETIC INFORMATION

CROSS-REFERENCE TO RELATED APPLICATIONS

This application claims the benefit under 35 USC § 119(a) of Korean Patent Application No. 10-2019-0150691 filed on Nov. 21, 2019 in the Korean Intellectual Property Office, the entire disclosure of which is incorporated herein by reference for all purposes.

BACKGROUND

1. Field

The following description relates to technology for determining kinetic information related to a vehicle, for example, technology for determining kinetic information related to a vehicle using a radar device.

2. Description of Related Art

Kinetic information related to a vehicle may be estimated using a single radar device. Estimation using a single radar device assumes a single-track model with the Ackerman condition and is used to estimate a longitudinal speed and a yaw rate of the vehicle. To estimate the kinetic information, target detection is performed based on data sensed by the radar device. The kinetic information may be estimated based on angle and speed information related to detected targets.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of determining kinetic information includes: receiving a plurality of raw information related to a plurality of objects using a radar device provided in a vehicle; obtaining, by analyzing the plurality of raw information, a plurality of candidate kinetic information related to the vehicle; estimating, through spatial filtering, current first kinetic information related to the vehicle from the plurality of candidate kinetic information; and correcting, using a kinetic model, the estimated current first kinetic information based on current first kinetic information, wherein the current first kinetic information is predicted from previous first kinetic information related to the vehicle using a kinetic model.

The correcting of the estimated current first kinetic information may include: predicting the current first kinetic information based on the previous first kinetic information using the kinetic model; and correcting the estimated current first kinetic information based on the predicted current first kinetic information.

The correcting of the estimated current first kinetic information may further include obtaining corrected current first kinetic information by applying a weighted mean to the estimated current first kinetic information and the predicted current first kinetic information.

The obtaining of the corrected current first kinetic information may include: calculating a reliability of the estimated current first kinetic information and a reliability of the predicted current first kinetic information; and obtaining the corrected current first kinetic information by applying the weighted mean to the estimated current first kinetic information and the predicted current first kinetic information based on the reliability of the estimated current first kinetic information and the reliability of the predicted current first kinetic information.

The correcting of the estimated current first kinetic information may include correcting the estimated current first kinetic information based on the predicted current first kinetic information using a Kalman filter.

The method may further include: obtaining second kinetic information related to the vehicle by analyzing sensor information received through a sensor. The correcting of the estimated current first kinetic information may include correcting the estimated current first kinetic information based on the second kinetic information and the predicted current first kinetic information.

The method may further include: generating image information of a space in which the vehicle is positioned, based on the previous first kinetic information and previous position information related to the vehicle; and estimating current position information related to the vehicle based on the image information and the plurality of raw information. The correcting of the estimated current first kinetic information may include correcting the estimated current first kinetic information and the estimated current position information based on the predicted current first kinetic information and the estimated current position information.

The generating of the image information may include generating the image information using simultaneous localization and mapping (SLAM).

The spatial filtering may include a process of selecting candidate kinetic information related to a stationary object from among the plurality of candidate kinetic information in a same time frame.

In another general aspect, a non-transitory computer-readable storage medium stores instructions that, when executed by a processor, cause the processor to perform the method described above.

In another general aspect, an apparatus for determining kinetic information includes a radar device and a processor. The radar device is configured to receive a plurality of raw information related to a plurality of objects. The processor is configured to: obtain, by analyzing the plurality of raw information, a plurality of candidate kinetic information related to a vehicle; estimate, through spatial filtering, current first kinetic information related to the vehicle from the plurality of candidate kinetic information; and correct the estimated current first kinetic information based on current first kinetic information, wherein the current first kinetic information is predicted from previous first kinetic information related to the vehicle using a kinetic model.

The processor may be further configured to: predict the current first kinetic information based on the previous first kinetic information using the kinetic model; and correct the estimated current first kinetic information based on the predicted current first kinetic information.

The processor may be further configured to obtain corrected current first kinetic information by applying a weighted mean to the estimated current first kinetic information and the predicted current first kinetic information.

The processor may be further configured to: calculate a reliability of the estimated current first kinetic information and a reliability of the predicted current first kinetic information; and obtain the corrected current first kinetic information by applying the weighted mean to the estimated current first kinetic information and the predicted current first kinetic information based on the reliability of the estimated current first kinetic information and the reliability of the predicted current first kinetic information.

The processor may be further configured to correct the estimated current first kinetic information based on the predicted current first kinetic information using a Kalman filter.

The processor may be further configured to: obtain second kinetic information related to the vehicle by analyzing sensor information received through a sensor, and correct the estimated current first kinetic information based on the second kinetic information and the predicted current first kinetic information.

The processor may be further configured to: generate image information of a space in which the vehicle is positioned, based on the previous first kinetic information and previous position information related to the vehicle; estimate current position information related to the vehicle, based on the image information and the plurality of raw information; and correct the estimated current first kinetic information and the estimated current position information, based on the predicted current first kinetic information and the estimated current position information.

The processor may be further configured to generate the image information using simultaneous localization and mapping (SLAM).

The spatial filtering may include a process of selecting candidate kinetic information related to a stationary object from among the plurality of candidate kinetic information in a same time frame.

Other features and aspects will be apparent from the following detailed description, the drawings, and the claims.

Figure 1:
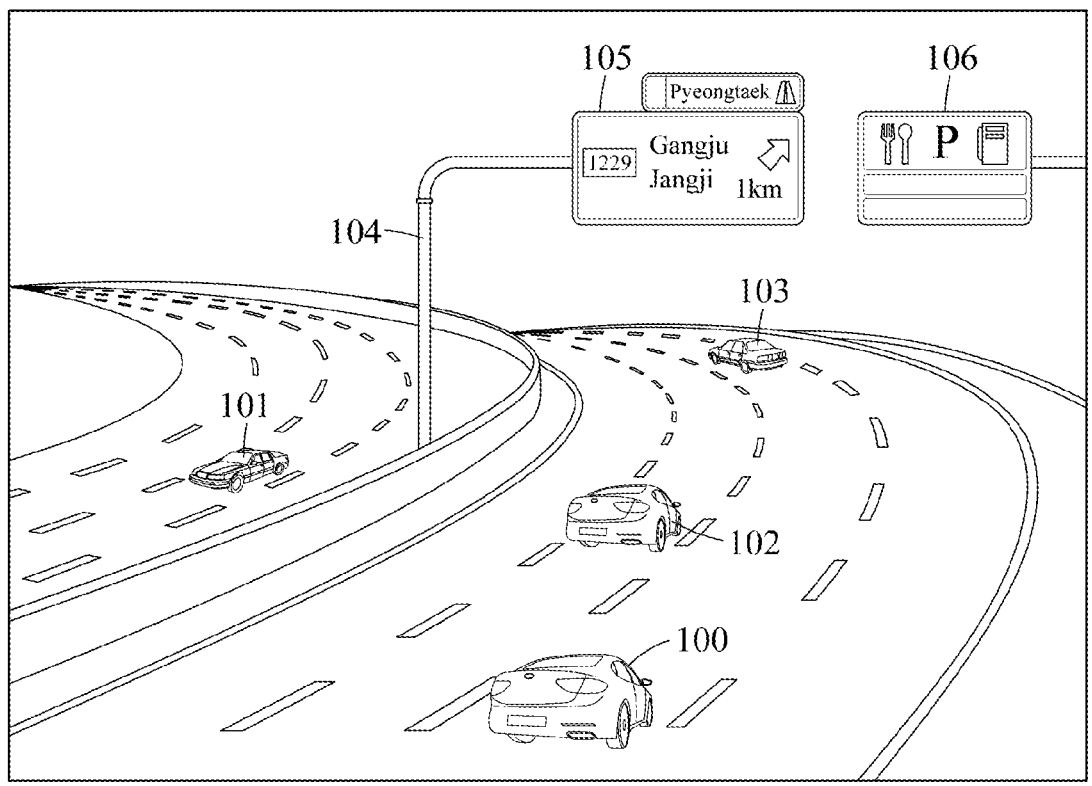
FIG. 1 illustrates an example of a situation in which kinetic information is determined by a kinetic information determining apparatus.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a situation in which kinetic information is determined by a kinetic information determining apparatus.

Referring to FIG. 1, a kinetic information determining apparatus determines kinetic information related to a vehicle 100 of a user. The kinetic information determining apparatus may determine the kinetic information related to the vehicle 100 using a radar device. The vehicle 100 may be a vehicle in which the kinetic information determining apparatus is disposed. The kinetic information determining apparatus may increase the accuracy of the kinetic information by performing filtering with respect to candidate kinetic information analyzed by the radar device. The kinetic information determining apparatus may increase the accuracy of the kinetic information by performing spatial filtering and temporal filtering with respect to the candidate kinetic information analyzed by the radar device.

The kinetic information determining apparatus may operate in a vehicle radar device, or operate as a separate signal processor that receives data from one or more radar devices. The separate signal processor may be provided in a vehicle or implemented as a separate server or computer that uses wireless communication. The kinetic information determining apparatus may use a vehicle radar device, and may derive kinetic information with a relatively high accuracy when using multiple radar devices at the same time.

The kinetic information determining apparatus receives a plurality of raw information related to a plurality of objects using the radar device provided in the vehicle 100. The plurality of objects may include all objects existing outside of the vehicle 100 and reflecting signals radiated from the radar device. The objects may include, for example, objects 104, 105, and 106 that are stationary at absolute coordinates and moving objects 101, 102, and 103. Candidate kinetic information analyzed from a signal reflected from a stationary object may have a higher reliability than candidate kinetic information analyzed from a signal reflected from a moving object.

The kinetic information determining apparatus may estimate current first kinetic information related to the vehicle from a plurality of candidate kinetic information through spatial filtering. The kinetic information determining apparatus may distinguish the signal reflected from the stationary object and the signal reflected from the moving object through spatial filtering, and extract the signal reflected from the stationary object. Here, the spatial filtering may include distinguishing a stationary object and a moving object in the same time frame and extracting information related to the stationary object. For example, the kinetic information determining apparatus distinguishes the signal reflected from the stationary object and the signal reflected from the moving object in the same time frame through spatial filtering, and extracts the signal reflected from the stationary object or selects candidate kinetic information related to the stationary object from among the plurality of candidate kinetic information. The kinetic information determining apparatus may estimate current first kinetic information from the signal reflected from the stationary object. Hereinafter, kinetic information derived through spatial filtering will be referred to as estimated current first kinetic information. The current first kinetic information may be different from previous first kinetic information. The kinetic information is determined through a plurality of operations. Kinetic information of a previous operation will be referred to as previous first kinetic information, and kinetic information of a current operation will be referred to as current first kinetic information.

The kinetic information determining apparatus may detect objects based on data sensed by the radar device provided in the vehicle 100. The kinetic information determining apparatus may filter stationary objects based on angle and speed information related to the detected objects and estimate kinetic information based on data of the selected objects. For example, the kinetic information determining apparatus classifies the stationary objects using a random sample consensus (RANSAC) technique and estimates the kinetic information.

If most of the objects outside of the vehicle 100 are in a dynamic state, outliers may remain despite spatial filtering. If a stationary object is detected, a relatively accurate longitudinal speed is estimated, but the accuracy of a yaw rate is relatively low. In general, the longitudinal speed is estimated with an accuracy of a level measured in practice using a wheel sensor. However, the yaw rate is estimated at accuracy with a greater error than an inertial measurement unit (IMU) commonly mounted on a vehicle. Thus, such factors may cause errors in kinetic information estimated through spatial filtering.

The kinetic information determining apparatus corrects the kinetic information estimated by performing temporal filtering. Through the temporal filtering, the kinetic information determining apparatus may remove outliers not excluded through spatial filtering. The kinetic information determining apparatus may determine more accurate kinetic information by additionally applying temporal filtering. A value of the estimated kinetic information is used as an input of an estimate corrector. This input is used as a measurement of the noisy kinetic information. The estimate corrector predicts kinetic information of a current time based on a physical model. Internal parameters of the estimate corrector and an estimate of the kinetic information are updated based on a value estimated by a kinetic information estimator and a value predicted by a physical model-based predictor, and a final estimate of the kinetic information is output.

The kinetic information determining apparatus may perform temporal filtering to supplement inaccurate data of a sensor such as a global positioning system (GPS) or IMU. For example, the kinetic information determining apparatus increases the accuracy of data using the Kalman filter. The kinetic information determining apparatus predicts a movement of the vehicle through a kinetic model. The kinetic information determining apparatus uses the kinetic information estimated using the Kalman filter as a noisy measurement and corrects the predicted kinetic information through the kinetic model. The kinetic information determining apparatus may determine more accurate kinetic information by refining a noisy estimate included in each operation using the Kalman filter.

The kinetic information determining apparatus corrects the estimated current first kinetic information based on the current first kinetic information predicted from the previous first kinetic information related to the vehicle using the kinetic model. The kinetic information determining apparatus increases the accuracy of the kinetic information through temporal filtering. The kinetic information determining apparatus predicts the current first kinetic information using the kinetic model from the previous first kinetic information. Hereinafter, the current first kinetic information derived through the kinetic model will be referred to as predicted current first kinetic information. The kinetic model may include various types of physical models.

The physical models may include Constant Turn Rate and Velocity (CTRV), Constant Turn Rate and Acceleration (CTRA), Constant Curvature and Acceleration (CCA), and the like. For example, in a case of the CTRA, a state is defined as $$\begin{bmatrix} x \\ y \\ \psi \\ v \\ \dot{\psi} \\ a \end{bmatrix}.$$

x and y denote a coordinate system that is based on a radar device or a platform on which a radar device is mounted. ψ and ψ̇ respectively denote a heading direction and a yaw rate. v and a respectively denote a longitudinal speed and a longitudinal acceleration. Values estimated by the kinetic information determining apparatus are v and ψ̇. If other sensor information is retrieved, a and ψ̇ are measured in a case of the IMU, x and y are measured in a case of the GPS, and v is measured in a case of the wheel sensor. As described above, more measurements and more various state information are measured through additional sensors. The kinetic information determining apparatus may determine more accurate and stable kinetic information by reflecting additional sensor information.

The kinetic information determining apparatus may derive more accurate results by integrating the predicted current first kinetic information with the estimated current first kinetic information. The kinetic information determining apparatus determines accurate kinetic information by correcting the kinetic information from data obtained by sensing external objects by the radar device. As described above, the kinetic information determining apparatus updates parameters constituting the kinetic information using the predicted value and the estimated value. Through this, the kinetic information determining apparatus determines more accurate and high-reliability kinetic information. The kinetic information determining apparatus may perform temporal filtering using results of a previous operation while at the same time applying spatial filtering to a plurality of object candidate groups for each operation, thereby producing results more robust against outliers in an actual driving situation.

Figure 2:
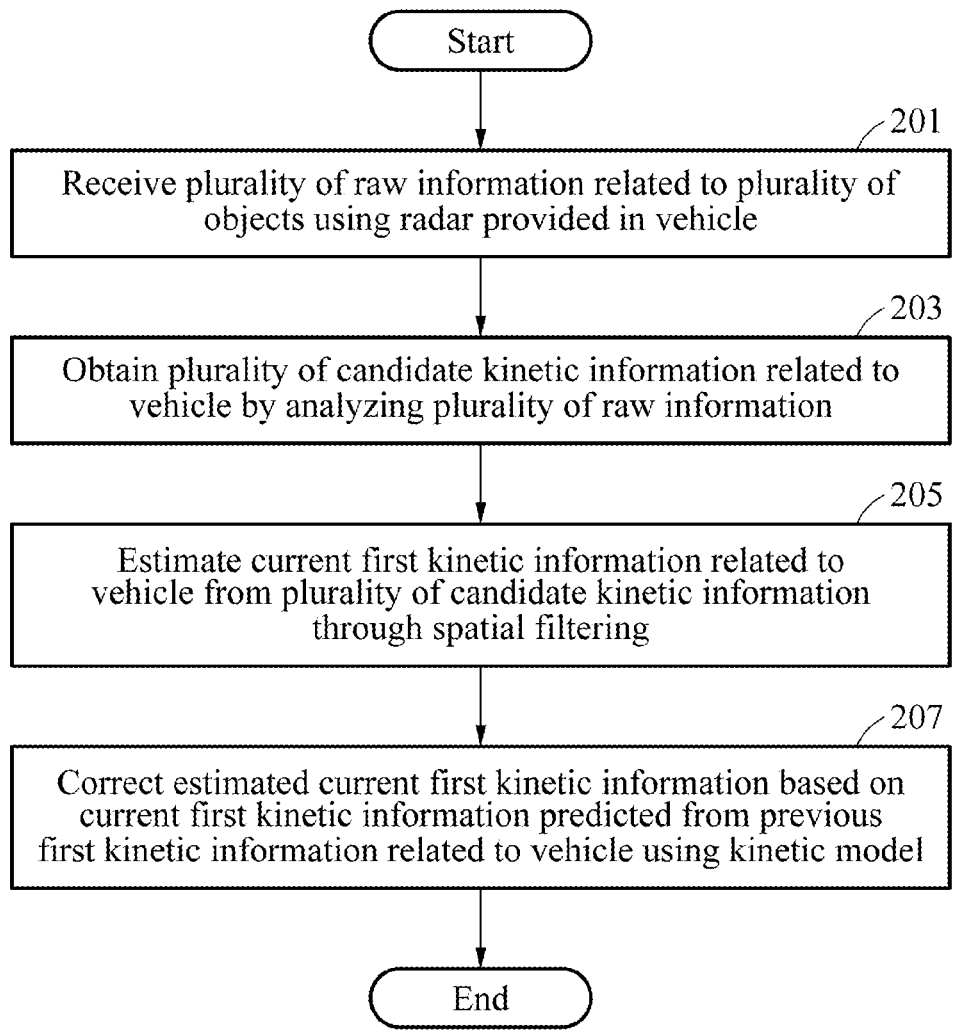
FIG. 2 illustrates an example of a kinetic information determining method.

FIG. 2 illustrates an example of a kinetic information determining method.

Referring to FIG. 2, in operation 201, a kinetic information determining apparatus receives a plurality of raw information related to a plurality of objects using a radar device provided in a vehicle. The radar device provided in the vehicle is generally provided parallel with the ground surface, rather than facing the air. A signal radiated from the radar device is reflected from the ground surface, and a received signal is transmitted to the radar device.

In operation 203, the kinetic information determining apparatus obtains a plurality of candidate kinetic information related to the vehicle by analyzing the plurality of raw information. The kinetic information determining apparatus obtains data of distance-horizontal angle-radial velocity from received raw signals. The kinetic information determining apparatus extracts a candidate group to be used to estimate kinetic information in a distance-horizontality domain. The kinetic information determining apparatus selects points corresponding to horizontal angles at which the intensities of the received signals are strong as the candidate group with respect to all regions within a detectable distance. The candidate group includes objects in a stationary state, for example, small trees, curbs, or the ground surface. In a case of each object included in the candidate group, a received signal has a weak intensity and includes noise, and thus a measurement may be inaccurate. However, candidate groups corresponding to the number of cells with respect to the total distance axis of the radar device may be obtained, and thus accurate information may be estimated by statistically processing values measured from multiple candidate groups.

In operation 205, the kinetic information determining apparatus estimates current first kinetic information related to the vehicle from the plurality of candidate kinetic information through spatial filtering. The kinetic information determining apparatus filters discordant data between kinetic information extracted from multiple objects using a RANSAC technique. Outliers have kinetic information in discord with each other and thus, are excluded through the RANSAC technique. The kinetic information determining apparatus removes an outlier of a current operation using the RANSAC technique. However, the RANSAC technique is merely provided as an example. The kinetic information determining apparatus may perform spatial filtering and kinetic information estimation through various types of outlier removal techniques or other techniques using statistical models.

In operation 207, the kinetic information determining apparatus corrects the estimated current first kinetic information based on current first kinetic information predicted from previous first kinetic information related to the vehicle using a kinetic model. For example, the kinetic information determining apparatus predicts the current first kinetic information based on the previous first kinetic information using the kinetic model. The corrected current first kinetic information may be obtained by applying a weighted mean to the estimated current first kinetic information and the predicted current first kinetic information.

The kinetic information determining apparatus may calculate a reliability of the estimated current first kinetic information and a reliability of the predicted current first kinetic information. For example, the kinetic information determining apparatus obtains the corrected current first kinetic information by applying the weighted mean to the estimated current first kinetic information and the predicted current first kinetic information based on the reliabilities. For example, the kinetic information determining apparatus corrects the estimated current first kinetic information based on the predicted current first kinetic information using the Kalman filter.

In correcting the estimated current first kinetic information, the kinetic information determining apparatus obtains second kinetic information related to the vehicle by analyzing sensor information received through a sensor. The kinetic information determining apparatus utilizes the radar device and other sensors in estimating the kinetic information. The kinetic information determining apparatus may obtain information related to sensors provided in the vehicle, for example, a wheel sensor, an IMU, and/or a GPS provided in the vehicle, through in-vehicle communication such as CAN interface. The kinetic information determining apparatus corrects the estimated current first kinetic information based on the second kinetic information and the predicted current first kinetic information.

Figure 3:
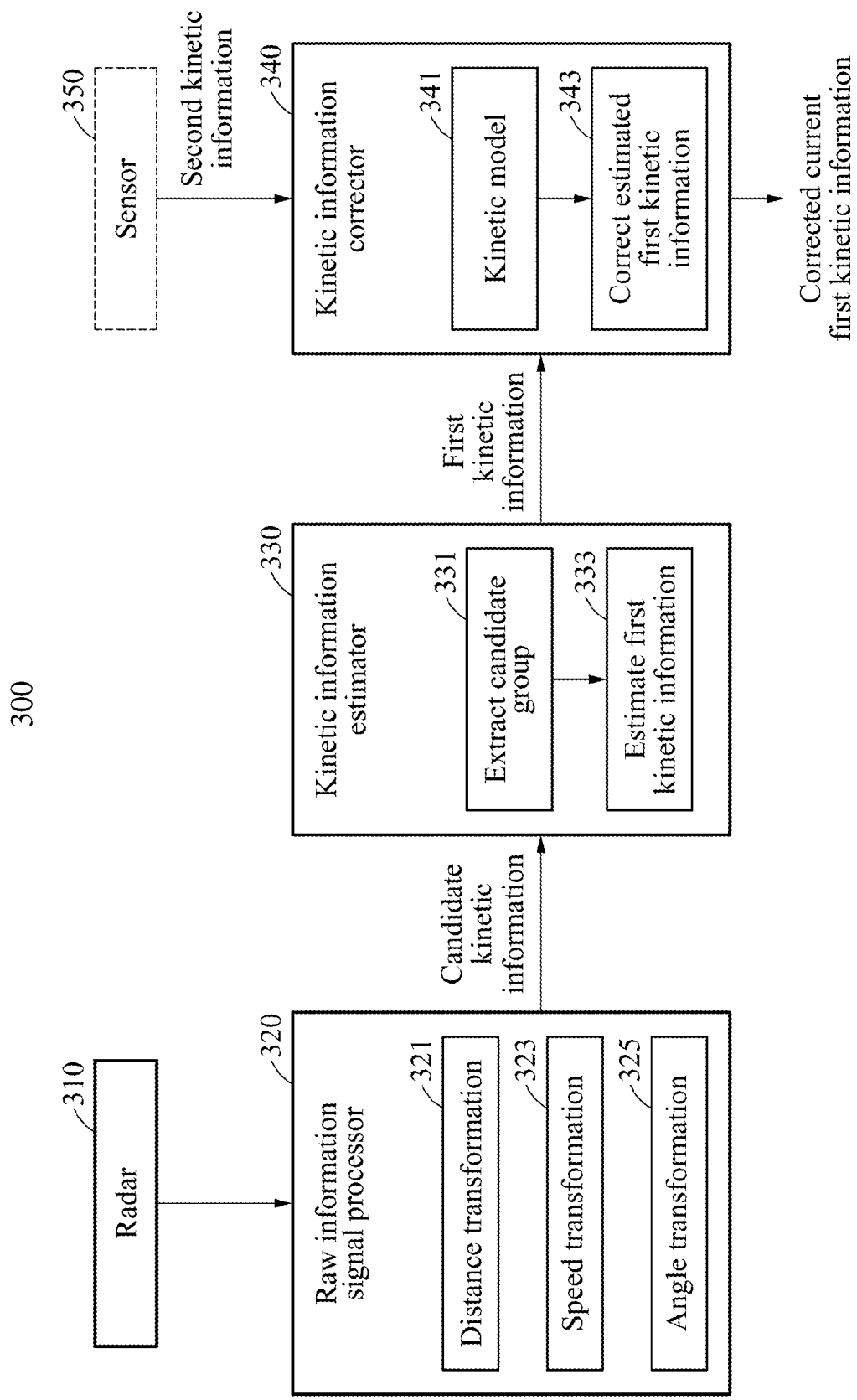
FIG. 3 illustrates an example of determining kinetic information by a kinetic information determining apparatus.

FIG. 3 illustrates an example of determining kinetic information by a kinetic information determining apparatus 300.

Referring to FIG. 3, the kinetic information determining apparatus 300 includes, for example, a radar device 310, a raw information signal processor 320, a kinetic information estimator 330, and a kinetic information corrector 340.

Figure 6:
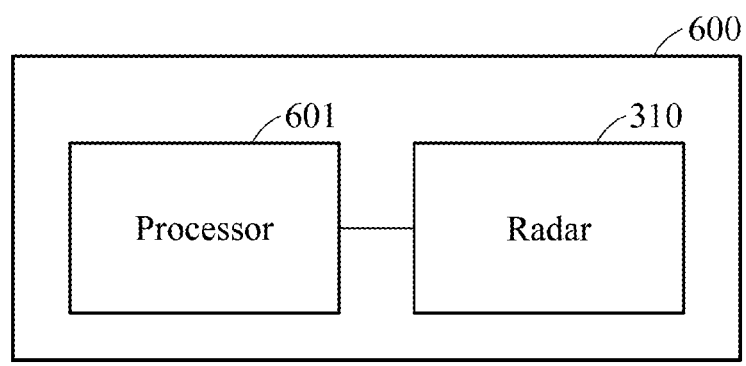
FIG. 6 illustrates an example of a configuration of a kinetic information determining apparatus.

However, this configuration is merely provided as an example. The kinetic information determining apparatus 300 may, in a more general example, include a processor and a radar device as shown in FIG. 6.

The radar device 310 radiates a transmission signal to an outside of a vehicle and receives a reception signal. The radar device 310 may obtain raw data related to an object with a strong intensity of a reflected signal and raw data related to an object with a weak intensity of a reflected signal. In general, the intensity of a reflected signal is strong for a moving object, and the intensity of a reflected signal is weak for an object in a stationary state.

The raw information signal processor 320 analyzes the raw information received from the radar device 310. In analyzing the received raw information, the raw information signal processor 320 transforms a domain of the raw information. For example, the raw information signal processor 320 performs a distance transformation 321, a speed transformation 323, or an angle transformation 325 with respect to the raw information. Through these transformations, the raw information signal processor 320 obtains candidate kinetic information.

The kinetic information estimator 330 estimates first kinetic information from the candidate kinetic information. For example, in operation 331, the kinetic information estimator 330 extracts a candidate group from the candidate kinetic information. In operation 333, the kinetic information estimator 330 estimates the first kinetic information from the candidate group.

The kinetic information corrector 340 corrects the estimated first kinetic information. For example, in operation 341, the kinetic information corrector 340 predicts kinetic information of a current operation from kinetic information determined in a previous operation using a kinetic model. In operation 343, the kinetic information corrector 340 corrects the estimated first kinetic information based on predicted values. Consequently, the kinetic information corrector 340 outputs corrected current first kinetic information of the current operation.

In another example, the kinetic information determining apparatus 300 may further include a sensor 350. In such an example, the kinetic information corrector 340 receives second kinetic information from the sensor 350 and more precisely corrects the first kinetic information based on the second kinetic information and the predicted values. For example, the kinetic information determining apparatus 300 performs more precise position and pose estimation by integrating information related to heterogeneous sensors such as a camera, an ultra, and a radar sensor or GPS, IMU, and V2X communications.

Figure 4:
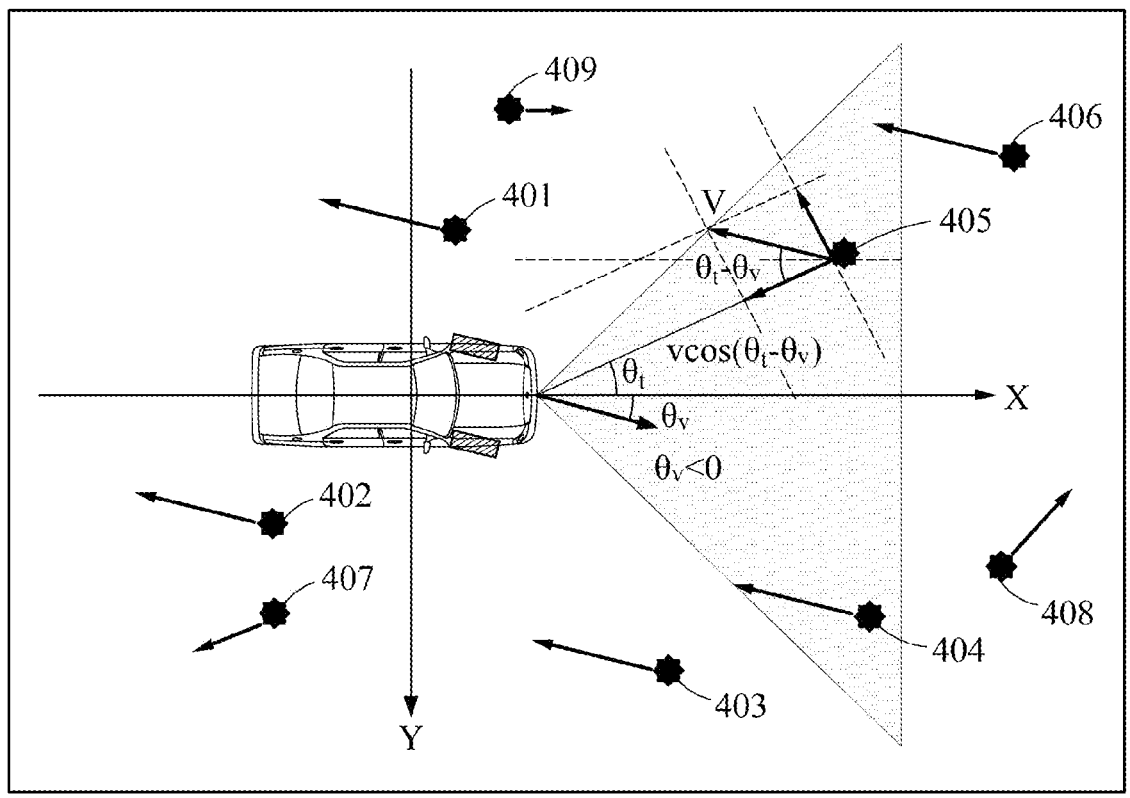
FIG. 4 illustrates an example of searching for a plurality of objects by a kinetic information determining apparatus.

FIG. 4 illustrates an example of searching for a plurality of objects by a kinetic information determining apparatus.

A kinetic information determining apparatus detects a stationary object, rather than detecting an object referred to as a "target" in terms of general radar signal processing. Objects with a strong power of a received signal with respect to a signal transmitted by a radar device are typically in a dynamic state, and the target in terms of general radar signal processing refers to a dynamic object. The dynamic object is in a moving state, and thus if kinetic information is estimated from raw data obtained from the dynamic object, serious errors may occur.

In FIG. 4, objects 401, 402, 403, 404, 405, and 406 are stationary objects, and objects 407, 408, and 409 are dynamic objects, for example. The kinetic information determining apparatus may extract a candidate group for estimating kinetic information from raw kinetic information. The kinetic information determining apparatus may extract the stationary objects 401, 402, 403, 404, 405, and 406 as the candidate group. As described above, the kinetic information determining apparatus estimates kinetic information through the kinetic information related to the stationary objects, thereby deriving more accurate kinetic information.

Figure 5:
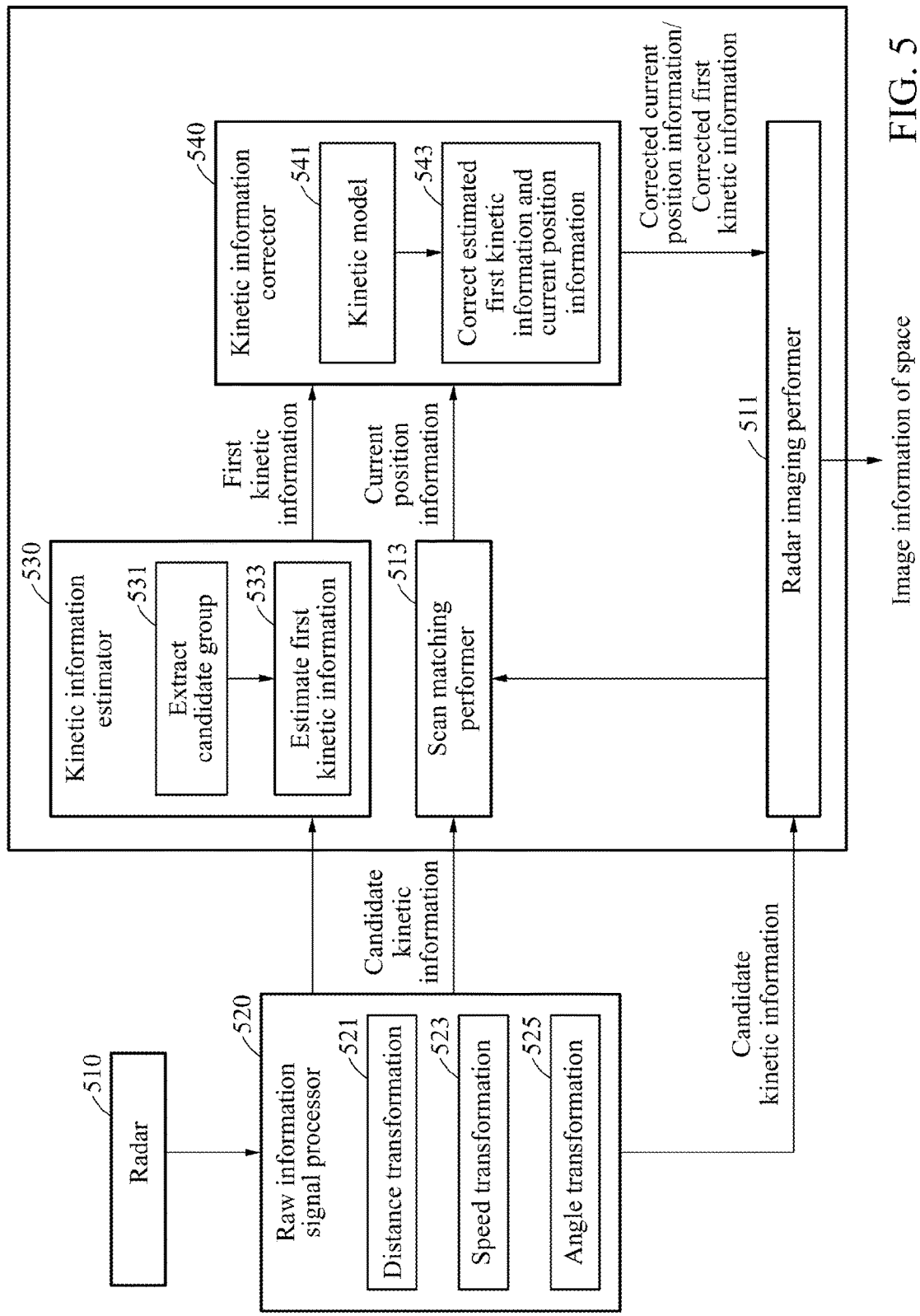
FIG. 5 illustrates an example of determining kinetic information by a kinetic information determining apparatus.

FIG. 5 illustrates an example of determining kinetic information by a kinetic information determining apparatus 500.

A kinetic information determining apparatus may generate image information of a space in which a vehicle is positioned, based on previous first kinetic information and previous position information related to the vehicle. The kinetic information determining apparatus may estimate current position information related to the vehicle based on the image information and a plurality of raw information. The kinetic information determining apparatus may correct estimated current first kinetic information and estimated current position information based on the predicted current first kinetic information and the estimated current position information. For example, the kinetic information determining apparatus generates the image information using simultaneous localization and mapping (SLAM).

To generate the image information, the kinetic information determining apparatus 500 includes a radar device 510, a raw information signal processor 520, a kinetic information estimator 530, a kinetic information corrector 540, and a radar imaging performer 511, for example. However, this configuration is merely provided as an example. In a more general example, the kinetic information determining apparatus 500 may include a processor and a radar device as shown in FIG. 6.

The radar device 510 may radiate a transmission signal to an outside of the vehicle and receive a reception signal. The radar device 510 may obtain raw data related to an object with a strong intensity of a reflected signal and raw data related to an object with a weak intensity of a reflected signal.

The raw information signal processor 520 analyzes the raw information received from the radar device 510. The raw information signal processor 520 transforms a domain of the raw information. For example, in the transforming of the domain, the raw information signal processor 520 performs a distance transformation 521, a speed transformation 523, or an angle transformation 525 with respect to the raw information. Through these transformations, the raw information signal processor 520 obtains candidate kinetic information.

The kinetic information estimator 530 estimates first kinetic information from the candidate kinetic information. For example, in operation 531, the kinetic information estimator 530 extracts a candidate group from the candidate kinetic information. In operation 533, the kinetic information estimator 530 estimates the first kinetic information from the candidate group.

The kinetic information corrector 540 corrects the estimated first kinetic information. For example, in operation 541, the kinetic information corrector 540 predicts kinetic information of a current operation from kinetic information determined in a previous operation using a kinetic model. In operation 543, the kinetic information corrector 540 more accurately corrects the first kinetic information based on predicted values and current position information received from a scan matching performer 513. In operation 543, the kinetic information corrector 540 corrects the current position information received from the scan matching performer 513 based on the predicted values and the estimated first kinetic information.

The radar imaging performer 511 generates image information of a space around the vehicle based on the corrected current position information, the corrected current first kinetic information, and the candidate kinetic information. Such image information is transmitted to the scan matching performer 513 again and used to determine kinetic information of a subsequent operation.

For example, the kinetic information determining apparatus 500 may use the determined kinetic information for radar imaging. For example, the kinetic information determining apparatus 500 estimates v and ψ̇ and performs radar imaging using v and ψ̇. The kinetic information determining apparatus 500 may estimate position information x and y by applying scan matching to the generated radar image. The kinetic information determining apparatus 500 may accurately correct the estimated x, y, v, and ψ̇ and apply radar imaging thereto again.

FIG. 6 illustrates an example of a configuration of a kinetic information determining apparatus 600.

Referring to FIG. 6, a kinetic information determining apparatus 600 includes at least one processor 601 and the radar device 310, for example. The radar device 310 may receive a plurality of raw information related to a plurality of objects.

The processor 601 may obtain a plurality of candidate kinetic information related to a vehicle by analyzing the plurality of raw information. For example, the processor 601 estimates current first kinetic information related to the vehicle from the plurality of candidate kinetic information through spatial filtering. The processor 601 may correct the estimated current first kinetic information based on current first kinetic information predicted from previous first kinetic information related to the vehicle using a kinetic model.

The processor 601 may predict the current first kinetic information based on the previous first kinetic information using the kinetic model. The processor 601 may obtain the corrected current first kinetic information by applying a weighted mean to the estimated current first kinetic information and the predicted current first kinetic information. The processor 601 may calculate a reliability of the estimated current first kinetic information and a reliability of the predicted current first kinetic information, and obtain the corrected current first kinetic information by applying the weighted mean to the estimated current first kinetic information and the predicted current first kinetic information based on the reliabilities. For example, the processor 601 corrects the estimated current first kinetic information based on the predicted current first kinetic information using the Kalman filter. The processor 601 may correct the estimated current first kinetic information based on the predicted current first kinetic information.

In another example, the processor 601 may obtain second kinetic information related to the vehicle by analyzing sensor information received through a sensor. The processor 601 may correct the estimated current first kinetic information based on the second kinetic information and the predicted current first kinetic information.

In another example, the processor 601 may generate image information of a space in which the vehicle is positioned, based on the previous first kinetic information and previous position information related to the vehicle. The processor 601 may estimate current position information related to the vehicle based on the image information and the plurality of raw information. The processor 601 may correct the estimated current first kinetic information and the estimated current position information based on the predicted current first kinetic information and the estimated current position information. For example, the processor 601 may generate the image information using SLAM.

The radar devices 310 and 510, the raw information signal processors 320 and 520, the kinetic information estimators 330 and 530, the processors, the kinetic information correctors 340 and 540, the radar imaging performer 511, the processor 601, the processors, the memories, and other components and devices in FIGS. 1 to 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of determining kinetic information of a moving vehicle, the method comprising:
   receiving, using a radar device provided in the moving vehicle, signals reflected by a plurality of objects;
   obtaining a plurality of candidate kinetic information to the moving vehicle based on the signals reflected by the plurality of objects;
   estimating, through spatial filtering, current first kinetic information related to the moving vehicle from signals reflected by one or more stationary objects; and
   predicting, using a kinetic model, the current first kinetic information related to the moving vehicle based on previous first kinetic information related to the moving vehicle; and
   correcting the estimated current first kinetic information based on the predicted current first kinetic information.

2. The method of claim 1, wherein the estimated first kinetic information comprises
   one or more of a longitudinal speed of the moving vehicle, a longitudinal acceleration of the moving vehicle, a heading direction of the moving vehicle, and a yaw rate of the moving vehicle.

3. The method of claim 1, wherein the correcting of the estimated current first kinetic information further comprises obtaining corrected current first kinetic information by applying a weighted mean to the estimated current first kinetic information and the predicted current first kinetic information.

4. The method of claim 3, wherein the obtaining of the corrected current first kinetic information comprises:
   calculating a reliability of the estimated current first kinetic information;
   calculating a reliability of the predicted current first kinetic information; and
   obtaining the corrected current first kinetic information by applying the weighted mean to the estimated current first kinetic information and the predicted current first kinetic information based on the reliability of the estimated current first kinetic information and the reliability of the predicted current first kinetic information.

5. The method of claim 1, wherein the correcting of the estimated current first kinetic information comprises correcting the estimated current first kinetic information based on the predicted current first kinetic information using a Kalman filter that uses the estimated current first kinetic information as a noisy measurement.

6. The method of claim 1, further comprising:
   obtaining second kinetic information related to the vehicle by analyzing sensor information received through one or more sensors provided in the vehicle, wherein the correcting of the estimated current first kinetic information comprises correcting the estimated current first kinetic information based on the second kinetic information and the predicted current first kinetic information.

7. The method of claim 1, further comprising:
generating image information of a space in which the vehicle is positioned, based on the previous first kinetic information and previous position information related to the vehicle; and
estimating current position information related to the vehicle, based on the image information and at least some of the signals reflected by the plurality of objects,
wherein the correcting of the estimated current first kinetic information comprises correcting the estimated current first kinetic information and the estimated current position information, based on the predicted current first kinetic information and the estimated current position information.

8. The method of claim 7, wherein the generating of the image information comprises generating the image information using simultaneous localization and mapping (SLAM).

9. The method of claim 1, wherein the spatial filtering includes a process of selecting candidate kinetic information obtained from signals reflected by one or more stationary objects from among the plurality of candidate kinetic information in a same time frame.

10. A non-transitory computer-readable storage medium storing instructions that, when executed by a processor, cause the processor to perform the method of claim 1.

11. An apparatus for determining kinetic information of a moving vehicle, the apparatus comprising:
a radar device configured to receive signals reflected by a plurality of objects; and
a processor configured to:
obtain a plurality of candidate kinetic information related to the moving vehicle based on the signals reflected by the plurality of objects;
estimate, through spatial filtering, current first kinetic information related to the moving vehicle from signals reflected by one or more stationary objects
predict, using a kinetic model, the current first kinetic information related to the moving vehicle based on previous first kinetic information related to the moving vehicle; and
correct the estimated current first kinetic information based on the predicted current first kinetic information.

12. The apparatus of claim 11, wherein the processor is further configured to obtain corrected current first kinetic information by applying a weighted mean to the estimated current first kinetic information and the predicted current first kinetic information.

13. The apparatus of claim 12, wherein the processor is further configured to:
calculate a reliability of the estimated current first kinetic information;
calculate a reliability of the predicted current first kinetic information; and
obtain the corrected current first kinetic information by applying the weighted mean to the estimated current first kinetic information and the predicted current first kinetic information based on the reliability of the estimated current first kinetic information and the reliability of the predicted current first kinetic information.

14. The apparatus of claim 11, wherein the processor is further configured to correct the estimated current first kinetic information based on the predicted current first kinetic information using a Kalman filter that uses the estimated current first kinetic information as a noisy measurement.

15. The apparatus of claim 11, wherein the processor is further configured to:
obtain second kinetic information related to the vehicle by analyzing sensor information received through one or more sensors provided in the vehicle, and
correct the estimated current first kinetic information based on the second kinetic information and the predicted current first kinetic information.

16. The apparatus of claim 11, wherein the processor is further configured to:
generate image information of a space in which the vehicle is positioned, based on the previous first kinetic information and previous position information related to the vehicle;
estimate current position information related to the vehicle, based on the image information and at least some of the signals reflected by the plurality of objects; and
correct the estimated current first kinetic information and the estimated current position information, based on the predicted current first kinetic information and the estimated current position information.

17. The apparatus of claim 16, wherein the processor is further configured to generate the image information using simultaneous localization and mapping (SLAM).

18. An apparatus for determining kinetic information, the apparatus comprising:
a radar device configured to receive a plurality of raw information related to a plurality of objects; and
a processor configured to:
obtain, by analyzing the plurality of raw information, a plurality of candidate kinetic information related to a vehicle;
estimate, through spatial filtering, current first kinetic information related to the vehicle from the plurality of candidate kinetic information; and
correct the estimated current first kinetic information based on a predicted current first kinetic information,
wherein the predicted current first kinetic information is predicted, using a kinetic model, from previous first kinetic information related to the vehicle, and
wherein the spatial filtering includes a process of selecting candidate kinetic information related to a stationary object from among the plurality of candidate kinetic information in a same time frame.

19. The apparatus of claim 11, wherein the spatial filtering includes a process of selecting candidate kinetic information related to a stationary object from among the plurality of candidate kinetic information in a same time frame.

\* \* \* \* \*